United States Patent [19]
McMurtrey

[11] Patent Number: 5,878,627
[45] Date of Patent: Mar. 9, 1999

[54] TWO-PIECE JACK HANDLE

[75] Inventor: David K. McMurtrey, Maysville, Ky.

[73] Assignee: Wald Manufacturing Co., Inc., Maysville, Ky.

[21] Appl. No.: 884,900

[22] Filed: Jun. 30, 1997

[51] Int. Cl.$^6$ .............................. G05G 1/21; G05G 1/08; B25G 3/12; B25G 3/08
[52] U.S. Cl. ..................... 74/544; 74/543; 254/DIG. 3; 403/305; 403/300; 403/3; 403/329
[58] Field of Search ................. 74/543, 544, 545, 74/546, 548; 403/3, 329, 102, 305, 300; 254/DIG. 3, DIG. 1, 46, 113, 131, 424, 93 H; 16/114 R, 115; 24/573.1, 136 R, 483; 81/177.2

[56] References Cited

U.S. PATENT DOCUMENTS

| 1,014,009 | 1/1912 | Koons ..................................... 24/72.1 |
| 1,245,921 | 11/1917 | Holdren ........................ 254/DIG. 3 X |
| 1,262,483 | 4/1918 | Hall .............................................. 254/1 |
| 1,269,359 | 6/1918 | Young ..................................... 74/547 |
| 1,286,161 | 11/1918 | Wagner ........................ 254/DIG. 3 X |
| 1,422,279 | 7/1922 | Lydick ......................... 254/DIG. 3 X |
| 1,453,989 | 7/1923 | Norlund ........................ 254/DIG. 3 X |
| 1,498,602 | 6/1924 | Adell ............................................ 254/1 |
| 1,501,605 | 7/1924 | Lane ......................................... 74/543 |
| 1,503,087 | 7/1924 | Brown ..................................... 254/110 |
| 1,518,627 | 12/1924 | Wills ............................. 254/DIG. 3 X |
| 1,520,989 | 12/1924 | Webster ...................................... 254/1 |
| 1,531,732 | 3/1925 | Burkholder .............................. 74/547 |
| 1,597,347 | 8/1926 | Fildes ............................ 254/DIG. 3 X |
| 1,810,715 | 6/1931 | Larson et al. ............................. 74/546 |
| 1,989,823 | 2/1935 | Raabe ..................................... 439/370 |
| 2,254,085 | 8/1941 | Nilson ..................................... 254/103 |
| 2,318,108 | 5/1943 | Schramm ............................... 280/47.3 |
| 2,671,636 | 3/1954 | Olson ..................................... 200/5 R |
| 3,469,864 | 9/1969 | Guerreno ............................... 285/308 |
| 3,807,693 | 4/1974 | Castoe .......................................... 254/1 |
| 4,333,505 | 6/1982 | Jones et al. .............................. 141/383 |
| 4,514,108 | 4/1985 | Sagady ..................................... 403/359 |
| 4,539,003 | 9/1985 | Tucker ..................................... 604/905 |
| 4,564,172 | 1/1986 | Arzouman ................................... 254/1 |
| 4,586,696 | 5/1986 | Mugford et al. ........................ 254/122 |
| 4,631,056 | 12/1986 | Dye .......................................... 604/111 |
| 4,711,595 | 12/1987 | Magid et al. ....................... 403/329 X |
| 4,826,486 | 5/1989 | Palsrok et al. .......................... 604/174 |
| 4,997,421 | 3/1991 | Palsrok et al. .......................... 604/174 |
| 5,237,890 | 8/1993 | Gill .......................................... 74/546 |
| 5,297,670 | 3/1994 | Yamaguchi ............................. 403/329 |
| 5,301,389 | 4/1994 | Engel et al. .......................... 74/545 X |
| 5,381,707 | 1/1995 | Gill .......................................... 74/546 |
| 5,433,127 | 7/1995 | Messier ..................................... 74/543 |

FOREIGN PATENT DOCUMENTS 2030107 of 1980 United Kingdom .

Primary Examiner—Charles A. Marmor
Assistant Examiner—Ankur Parekh
Attorney, Agent, or Firm—Wood, Herron & Evans, LLP

[57] ABSTRACT

A two-piece handle for use in positioning a vehicle lifting jack beneath a vehicle and for rotating a spindle of that jack, which handle comprises a jack handle rod, a jack handle rod extension, and a jack handle coupling for releasably interconnecting the jack handle rod and the jack handle rod extension in co-axial alignment. The jack handle coupling comprises a sleeve mounted over and fixedly secured to a knuckle joint of the jack handle rod and adapted to receive a knuckle joint of the jack handle rod extension. A spring wire engageable with the knuckle joint of the jack handle rod extension secures the two pieces of the rod in coupled engagement. Preferably, the knuckle joints of both sections of the jack handle are formed by bending the ends of the rods 180° into a J-shaped configuration shaped to be permanently secured to the knuckle joint of one of the rods and to slidably receive the knuckle joint of the other rod.

19 Claims, 2 Drawing Sheets

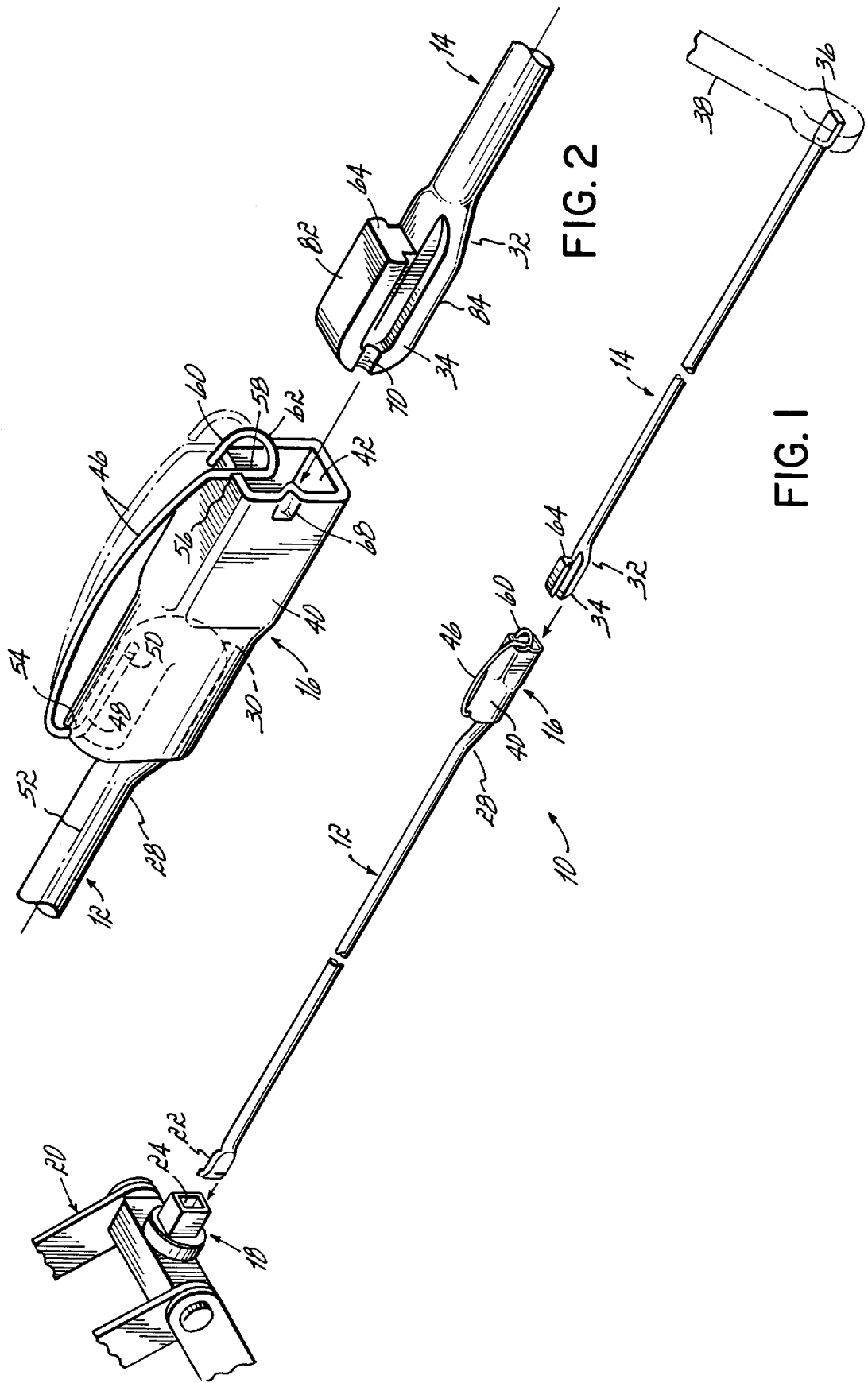

TWO-PIECE JACK HANDLE

This invention relates to vehicle jacks and, more particularly, to an improved handle for actuating such jacks.

BACKGROUND OF THE INVENTION

Motor vehicles have traditionally been equipped with a spare wheel to use in the event that one of the tires became flat or disinflated. Along with a spare wheel, some means for raising the vehicle in order to change the wheel must be provided. This means of lifting the vehicle has usually been some form of vehicle jack.

Some vehicle jacks have heretofore been designed to be positioned underneath the vehicle, usually just to the inside of the tire to be changed and the designated lifting point is generally the axle or other nearby wheel support structure. These jacks may be either of a scissors-type or a telescoping-type. In both cases, a rotary force is applied to the jack to cause it to move vertically to either raise or lower the vehicle depending upon whether the rotary motion is clockwise or counterclockwise.

To impart that rotary motion to the jack, a handle is attached to the jack spindle both to transmit the rotary motion to the jack and to help position the jack at the proper lifting location underneath the vehicle. The jack handle must be long enough to reach from the perimeter of the vehicle to the jack which is positioned underneath the vehicle while still allowing enough room for the operator to apply the rotary motion to the end of the handle remote from the jack.

In the past, there have been jack handles which were of one piece rod construction with a tip formed on one end to engage the jack spindle and a crank handle formed on the other end by two 90° bends. Since the length of these handles was fixed, a suitable location had to be found to store the handle inside the vehicle.

Other handles have been made in two pieces and then permanently fastened together at the juncture of the two pieces. The connection between the two pieces was usually a rivet or other similar permanent connector which allowed the two sections to fold or pivot 180° when not in use so as to require only about half the storage space required for a one-piece handle. Examples of such two-piece handles are to be found, for example, in U.S. Pat. Nos. 2,254,085; 2,318,108; and, 4,586,696. Handles were also made in two sections which could be temporarily connected together to actuate the jack and then separated into two pieces for storage. One such jack is disclosed in U.S. Pat. No. 2,671,636. Another such handle is currently in use in a 1997 Jeep Wrangler. This Jeep Wrangler jack handle comprises two pieces, one identified as a jack handle and the other as a jack handle extension, both of which are made from solid rod or wire. The connection of the two sections is accomplished by flattening one end of the jack handle so as to enable that flattened jack handle section to be received within an upset or enlarged end and an internal cavity of the jack handle extension. The two sections of the Jeep Wrangler jack handle are connected by inserting the flattened end of the jack handle into the cavity in the opposite upset or enlarged end of the jack handle extension. In order to maintain the two sections in assembled relationship, so as to enable the jack to be pulled or pushed to position or remove the jack from underneath the vehicle, a thumb screw extends through the upset or enlargement on the jack handle extension into engagement with the flattened end of the jack handle.

All of the jack handles heretofore described suffer from one deficiency or another. The one-piece jack handle requires too long a storage space to be practical for many applications. The two-piece permanently pivotally connected jack handles are relatively expensive, difficult to operate, and subject to breakage, and the two-piece separable jack handles heretofore described are relatively complex and expensive and require specialized and expensive machinery for manufacture. It has therefore been an objective of this invention to provide a two-piece jack handle which overcomes all of these limitations and which may be economically fabricated from wire rod.

It has been another objective of this invention to provide a two-piece jack handle in which the two pieces may be easily and quickly connected and disconnected.

Still another objective of this invention has been to provide a two-piece jack handle which meets these other objectives, but which also includes a connection at the end of the jack handle extension which may be used for the auxiliary purpose of operating a winch mechanism for raising and lowering a spare wheel stored on the underside of a vehicle.

SUMMARY OF THE INVENTION

The invention of this application which accomplishes these objectives is a two-piece jack handle comprising a jack handle rod, a jack handle rod extension, and a jack handle coupling for releasably interconnecting the jack handle rod and jack handle rod extension in co-axial alignment. The jack handle rod has a formed tip at a first end and a knuckle joint formed at its opposite end with the formed tip being adapted to engage and transmit rotary motion from the jack handle rod to a rotatable spindle of a vehicle lifting jack. The jack handle rod extension has a knuckle joint formed on a first end and a shaped end formed on the opposite end. The shaped end is releasably cooperable with a flat surface of a rotatable handle, such that rotation of the handle effects rotation of the jack handle rod. The jack handle coupling comprises a sleeve mounted over and fixedly secured to the knuckle joint of the jack handle rod, the sleeve having an extension portion extending beyond the end of the jack handle rod, which extension portion has an internal receptacle or cavity configured to receive, in a slip-fit, non-rotatable driving relationship, the knuckle joint of the jack handle rod extension. Each of the knuckle joints is formed by bending an end section of each rod 180° into a J-shaped configuration. In the preferred embodiment of the invention, there is a wire spring engageable with a flat surface of the knuckle joint of the jack handle rod extension which secures the jack handle rod and jack handle rod extension in coupled engagement. In this preferred embodiment of the invention, the knuckle joint of the jack handle rod extension has a pair of opposed flats formed thereon, which pair of opposed flats are adapted to be received in slip-fit driving relationship in a receptacle of a drive tube for operating a spare tire winch located on the underside of a motor vehicle.

The primary advantage of this application is that it provides a relatively inexpensive and efficient two-piece jack handle which may be easily and conveniently stored when not in use, but which may be quickly and easily assembled in a fail-safe manner for use as a jack handle. It also has the advantage of being relatively inexpensively manufactured from wire rod utilizing relatively inexpensive tooling.

These and other objects and advantages of this invention will be more readily apparent from the following description of the drawings, in which:

BRIEF DESCRIPTION OF THE DRAWINGS

FIG. 1 is a perspective view of a two-piece jack handle incorporating the preferred embodiment of this invention;

FIG. 2 is an enlarged perspective view of a portion of the jack handle of FIG. 1;

DETAILED DESCRIPTION OF THE DRAWINGS

Figure 4:
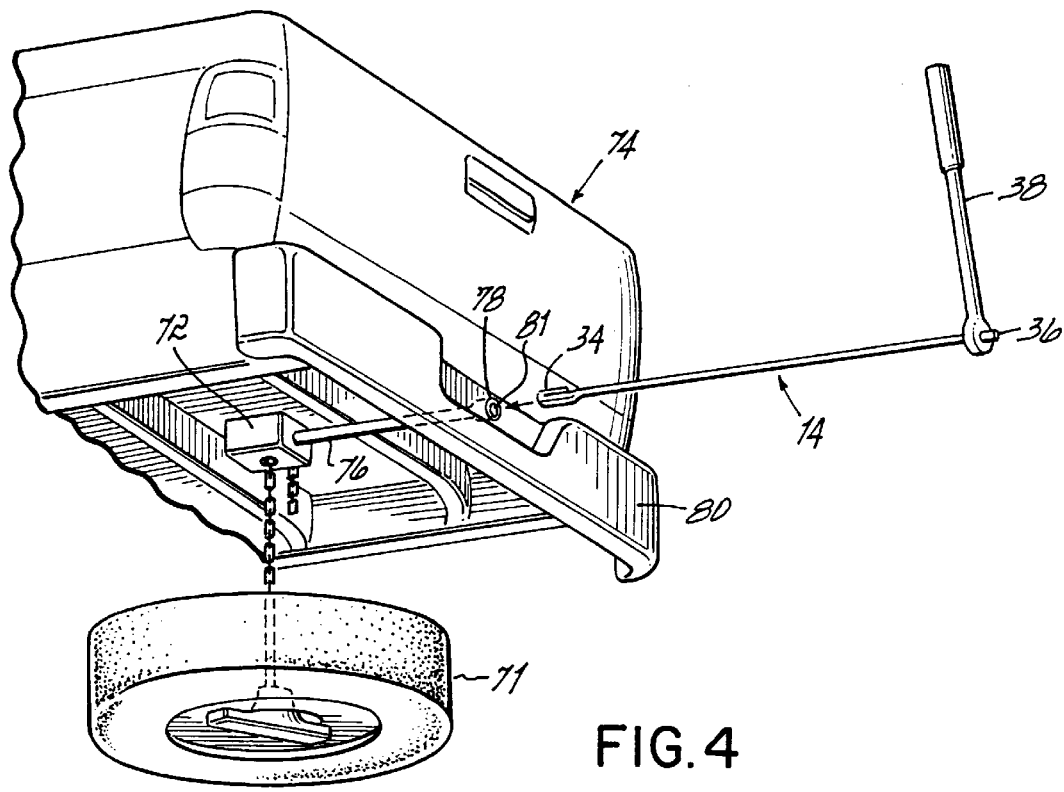
FIG. 4 is a perspective view of one piece of the jack handle of this invention utilized to actuate a spare tire winch located on the underside of a motor vehicle.

The two-piece jack handle 10 of this invention is illustrated in an exploded perspective view in FIG. 1 as comprising a jack handle rod 12 and a jack handle rod extension 14. In a preferred embodiment, both of these pieces of the jack handle 10 are manufactured from circular cross section wire rod, but they could as well be manufactured from square or other cross-section wire. This jack handle, when the two pieces 12 and 14 are coupled together via a jack handle coupling 16, may be used to rotate a conventional jack spindle 18 of a vehicle jack 20. The jack 20 forms no part of the invention of this application, and therefore, only a portion thereof has been illustrated in the drawings of this application. This jack may be any conventional jack, such as a conventional scissors style or telescoping style jack.

As illustrated in FIG. 1, the jack handle rod 12 has a formed tip 22 on one end, which formed tip is of conventional shape and adapted to be received within a receptacle 24 of the jack spindle 18.

Figure 3:
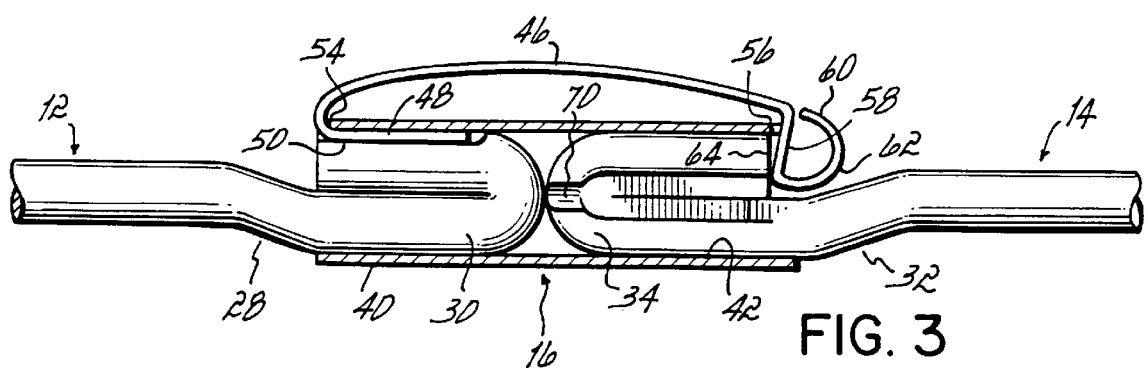
FIG. 3 is a cross sectional view taken through the jack handle coupling of the jack handle of FIG. 1, but illustrating the handle in an assembled or coupled relationship.

At the opposite end of the jack handle rod 12 from the formed tip 22, a short end section 28 of the rod is bent 180° into a J-shape or so-called formed knuckle joint 30, as best shown in FIGS. 2 and 3.

The jack handle rod extension 14 similarly has an end section 32 bent 180° into a J-shaped end or knuckle joint 34. At its opposite end, the jack handle rod extension 14 has a flat 36 formed thereon, which flat 36 is adapted to cooperate with a conventional rotatable handle 38 for effecting rotation of the jack handle rod extension 14. The handle 38 forms no part of this invention, and therefore, has been illustrated in phantom in FIG. 1 and in solid lines in FIG. 4.

The jack handle coupling 16 which is intended to releasably interconnect or couple the two pieces 12 and 14 of the jack handle comprises a short piece of metal tubing 40, which after being cut to length, is shaped by two arbors (not shown), each of which has a cross section which matches the corresponding cross section of the knuckle joints 30, 34. These arbors are forced into opposite ends of the tubing, shaping the inside of the tubing or sleeve 40 to match the corresponding outside shape of each knuckle joint 30, 34, respectively. The inside dimensions of the end of the tube or sleeve 40 which is assembled onto the knuckle joint 30 on the jack handle rod 12 is sized slightly smaller than the corresponding dimension on the knuckle joint 30, such that an interference fit is created when the sleeve is forced over the knuckle joint 30. This interference or force fit of the sleeve 40 over the knuckle joint 30 of the jack handle rod 12 ensures that the two pieces are permanently connected.

The inside dimensions on the end of the tube or sleeve which is to be mated with the knuckle joint 34 on the jack handle extension are slightly larger than the corresponding exterior dimensions on the knuckle joint 34, such that a sliding fit or slip-fit is created between the two when the knuckle joint 34 is inserted into the shaped internal receptacle 42 of the sleeve 40. This slip-fit enables the knuckle joint 34 on the end of the jack handle extension to be freely inserted and removed from the coupling sleeve 40. Generally, both ends of the tube or sleeve 40 are rectangularly shaped, such that the non-circular cross sections of the knuckle joints 30, 34 and sleeve ends enable the connections to transmit applied torque from the jack handle extension to the jack handle and subsequently to the spindle 18 of the jack 20 without slippage or rotation at the connections.

With reference to FIG. 2, it will be seen that the jack handle coupling 16 includes a wire spring 46 which functions to latch the two pieces of the jack handle in an assembled relationship when the jack handle rod extension 14 is fully inserted into the internal receptacle 42 of the coupling sleeve 40. This wire spring 46 has an end section 48 located interiorly of the end coupling sleeve 40 and residing within a groove 50 formed on the top side of the knuckle joint 30 with the end 48 of the spring extending parallel to the center line of the jack handle. The end 48 of the wire spring extends upwardly from within the tube through a notch 54 in one end of the tube or sleeve 40 and then extends for the length of the tube toward the opposite end. At the opposite end 58 of the wire spring, it is bent inwardly so as to pass through a notch 56 at the opposite end of the tube or sleeve. After passing through the notch 56 of the sleeve 40, the end 58 of the wire spring extends inwardly into the receptacle 42 of the sleeve and then outwardly in a semicircular bend to an end 60.

The two notches 54, 56 in the top of the sleeve 40 reside in a common plane which passes radially through the center line or axis 52 of the jack handle rod 12. When the coupling sleeve 40 is pressed onto and over the knuckle joint 30, the end 48 of the wire spring is hooked inside the coupling sleeve and aligns with the groove 50 formed in the top of the knuckle joint 30. The groove is of a depth such that pressure between the groove in the knuckle joint and the inside surface of the connector tube securely hold the spring 46 in an assembled relationship between the sleeve and the knuckle joint.

In order to assemble or interconnect the two handle rods 12 and 14 by means of the coupling 16, either the free end section 58 of the spring can be lifted up and out of the notch 56 on the connector tube and moved to the side of the coupling sleeve 40 as best illustrated in phantom in FIG. 2, or the knuckle joint may be used as a cam against the sloping end section 62 of the wire spring to nudge or cam the wire spring upwardly out of the way of the knuckle joint as the knuckle joint 34 of the handle extension is inserted into the coupling sleeve 40. Once the knuckle joint 34 of the handle extension rod has been fully inserted into the coupling sleeve 40, the free end 58 of the wire spring either snaps downwardly automatically over the flat end surface 64 of the knuckle joint as illustrated in FIG. 3, or is physically lifted from against the side of the coupling sleeve and moved into the notch so as to position the end portion 58 of the spring against the flat surface 64 of the knuckle joint 34. When the spring is located in the position illustrated in FIG. 3, it blocks inadvertent removal of the knuckle joint of the handle rod extension 14 from the coupling.

In order to ensure that the handle extension rod 14 is always inserted with the flat surface 64 in a position to be engaged by the free end 58 of the wire spring 46, an internal detent 68 is formed on one side of the open end of the coupling sleeve 40 approximately 90° removed from the top spring receiving notch 56. A corresponding groove 70 is provided along one side of the knuckle joint 34 of the handle extension rod which thus provides an open channel for the entire length of the knuckle joint 34. When the knuckle joint 34 is inserted into the coupling sleeve 40, the detent 68 rides within the groove 70 and thereby ensures that the knuckle joint is always inserted with the flat surface 64 on the top side of the knuckle joint in a position to be engaged by the end of the spring 58.

Figure 5:
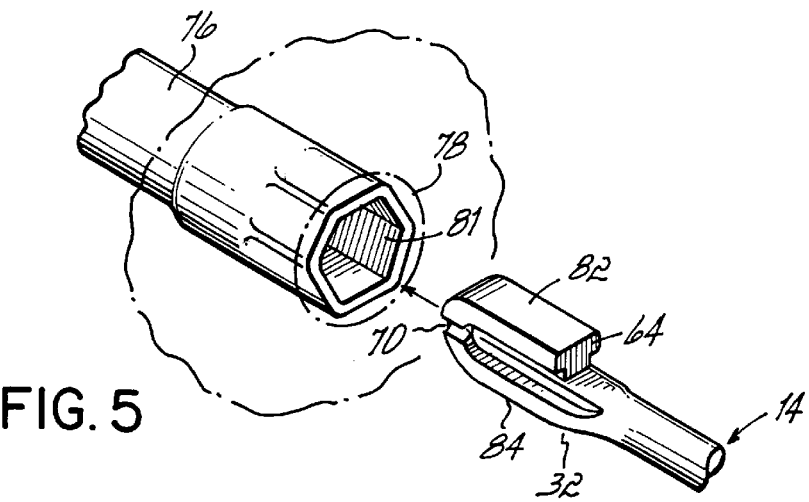
FIG. 5 is an enlarged perspective view of a portion of the jack handle and winch drive tube of FIG. 4.

If neither the jack handle rod 12 or the jack handle extension rod 14 are to be used for any auxiliary purpose other than raising and lowering the jack 20, then both knuckle joints are most economically formed by simply folding over the round cross section wire in the manner that the end section 28 of jack handle rod 12 is folded over through 180° into a J-shaped configuration. If on the other hand the jack handle extension 14 has other functions as, for example, to rotate a winch actuating tube 76 for raising and lowering a spare tire 71 as illustrated in FIGS. 4 and 5, then the cross sectional shape of the knuckle joint 34 is preferably configured so as to perform the auxiliary function and yet still mate with the coupling sleeve 40. As illustrated in FIGS. 4 and 5, one such auxiliary function of the jack handle extension rod is to raise and lower the spare wheel 71 via a winch 72 mounted on the underside of a vehicle 74. Generally, such a winch 72 is operated via the tube 76 which extends from the winch to and through a hole 78 in the body of the vehicle and located above the rear bumper 80. The exposed end of the tube 76 generally has an internal hexagon shape 81. In order to mate with that hexagon-shaped internal receptacle of the tube 76, the knuckle joint 34 on the jack handle extension rod must mate with all or part of this internal hexagonal configuration so as to transmit torque to operate the winch. To that end, the knuckle joint 34 of the jack handle extension rod is first formed into a generally T-shaped cross section prior to being bent 180° into the J-shaped knuckle joint. When the 180° bend is placed in the handle extension rod 14, the bottoms of the two T-shaped cross sections touch, and the tops 82, 84 of the two T-shaped cross sections form two parallel flat surfaces which are alignable and engageable with two of the opposed sides of the internal hexagonal-shaped receptacle 81 of the winch actuating tube 76.

In the operation of the jack handle heretofore described, the jack handle extension rod 14 would generally first be used to lower the spare wheel 71 via the winch 72 from beneath the underside of the vehicle 74. After the spare wheel is removed from its connection to the winch, the jack handle rod extension 14 is removed from engagement with the winch tube 76 and coupled to the jack handle rod 12 via the jack handle coupling 16. This involves no more than sliding the knuckle joint 34 of the jack handle rod extension 14 into the shaped internal receptacle 42 of the coupling sleeve 40 until the wire spring 46 snaps down over and engages the flat surface 64 of the knuckle joint 34. The rotatable handle 38 of the jack may then be slipped over the shaped end 36 of the jack handle extension rod and the formed tip 22 of the jack handle rod 12 inserted into the spindle receptacle of the jack. So assembled, the jack handle 38 may be rotated and through the coupling 16 transmit torque to the spindle of the jack.

After completion of the use of the jack 20, the formed tip of the jack handle rod may be removed from engagement with the receptacle of the spindle 18 of the jack and the coupling 16 disconnected for convenient storage of the two pieces 12, 14 of the jack handle.

While I have described only a single preferred embodiment of my invention, persons skilled in this art will appreciate changes and modifications which may be made without departing from the spirit of my invention. Therefore, I do not intend to be limited except by the scope of the following appended claims.

I claim:

1. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle cavity configured to receive in a slip-fit, non-rotatable driving relationship the knuckle joint of said jack handle rod extension, and said jack handle coupling including a wire spring engageable with a flat surface of said knuckle joint of said jack handle rod extension to secure said jack handle rod and said jack handle rod extension in coupled engagement wherein each of said knuckle joints comprises an end section of one of said rods bent 180° into a J-shaped configuration.

2. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle cavity configured to receive in a slip-fit, non-rotatable driving relationship the knuckle joint of said jack handle rod extension, and said jack handle coupling including a wire spring engageable with a flat surface of said knuckle joint of said jack handle rod extension to secure said jack handle rod and said jack handle rod extension in coupled engagement wherein each of said knuckle joints comprises an end section of one of said rods bent 180° into a J-shaped configuration and said knuckle joint of said jack handle rod extension has a pair of opposed flats formed thereon, said pair of opposed flats being adapted to be received in slip-fit driving relationship into a receptacle of a drive tube for operating a spare tire winch located on the underside of a motor vehicle.

3. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle cavity configured to receive in a slip-fit, non-rotatable driving relationship the knuckle joint of said jack handle rod extension, and said jack handle coupling including a wire spring engageable with a flat surface of said knuckle joint of said jack handle rod extension to secure said jack handle rod and said jack handle rod extension in coupled engagement wherein said wire spring has one end fixedly secured between said sleeve and said knuckle joint of said jack handle rod, said wire spring extending on the exterior of said sleeve for the length of said sleeve and having an opposite end located within a notch of said sleeve and extending inwardly from the exterior of said sleeve into said internal receptacle of said sleeve.

4. The two-piece handle of claim 3 wherein said notch is located on the top of said sleeve and said wire spring is removable from said notch and repositionable against an exterior side surface of said sleeve.

5. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle cavity configured to receive in a slip-fit, non-rotatable driving relationship the knuckle joint of said jack handle rod extension, and said jack handle coupling including a wire spring engageable with a flat surface of said knuckle joint of said jack handle rod extension to secure said jack handle rod and said jack handle rod extension in coupled engagement and said extension portion of said sleeve has a detent extending into said receptacle of said sleeve, said knuckle joint of said jack handle rod extension having a notch found on one side thereof and engageable with said detent to ensure that said wire spring engages said flat surface of said knuckle joint of said jack handle rod extension when said rods are in coupled engagement.

6. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod;

said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle configured to receive in a slip-fit, non-rotatable driving relationship the knuckle joint of said jack handle rod extension, each of said knuckle joints comprising an end section of one of said rods bent 180° into a J-shaped configuration, the sleeve of said jack handle coupling being press fit onto the knuckle joint of said jack handle rod.

7. The two-piece handle of claim 6 herein said knuckle joint of said jack handle rod extension has a pair of opposed flats formed thereon, said pair of opposed flats being adapted to be received in slip-fit driving relationship into a receptacle of a drive tube for operating a spare tire winch located on the underside of a motor vehicle.

8. A two-piece handle for use both in positioning and rotating a spindle of a vehicle lifting jack beneath a vehicle and for operating a spare tire winch located on the underside of a motor vehicle;

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle configured to receive in a slip-fit, non-rotatable driving relationship the knuckle joint of said jack handle rod extension, each of said knuckle joints comprising an end section of one of said rods bent 180° into a J-shaped configuration.

9. The two-piece handle of claim 8 wherein said knuckle joint of said jack handle rod extension has a pair-of opposed flats formed thereon, said pair of opposed flats being adapted to be received in slip-fit driving relationship into a receptacle of a drive tube for operating a spare tire winch located on the underside of a motor vehicle.

10. A multiple-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end by bending said jack handle rod approximately 180°, said formed tip being adapted to engage and transmit rotary motion from said jack handle rod to a rotatable spindle of a vehicle lifting jack;

said jack handle rod extension having a knuckle joint formed by bending said jack handle rod extension on a first end and a shaped end formed on the opposite end; and said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle cavity configured to receive in a slip-fit, non-rotatable driving relationship the knuckle joint of said jack handle rod extension, and said jack handle coupling including a wire spring engageable with a flat surface of said knuckle joint of said jack handle rod extension to secure said jack handle rod and said jack handle rod extension in coupled engagement.

11. A multiple-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end;

said jack handle coupling comprising a sleeve mounted over and fixedly secured to said knuckle joint of said jack handle rod, said sleeve having an extension portion extending beyond said knuckle joint of said jack handle rod, said extension portion of said sleeve having an internal receptacle configured to receive in a slip-fit, non-rotatable driving relationship the knuckle joint of said jack handle rod extension, each of said knuckle joints comprising an end section of one of said rods bent 180° into a J-shaped configuration, the sleeve of said jack handle coupling being press fit onto the knuckle joint of said jack handle rod.

12. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod;

said jack handle coupling comprising a sleeve mounted over and fixedly secured to said knuckle joint of one of said jack handle rod and jack handle rod extension, said sleeve having an extension portion extending beyond said knuckle joint of said one of said jack handle rod and jack handle rod extension, said extension portion of said sleeve having an internal receptacle configured to receive in a slip-fit, non-rotatable driving relationship the knuckle joint of said other of said jack handle rod and jack handle rod extension, each of said knuckle joints comprising an end section of one of said rods bent 180° into a J-shaped configuration, the sleeve of said jack handle coupling being press fit onto the knuckle joint of said one of said jack handle rod and jack handle rod extension.

13. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a formed tip at a first end and a J-shaped knuckle joint formed at its opposite end, said formed tip being adapted to engage and transmit rotary motion from said jack handle rod to a rotatable spindle of a vehicle lifting jack;

said jack handle rod extension having a knuckle joint formed on a first end and a shaped end formed on the opposite end, said shaped end having at least one flat surface releasably cooperable with a flat surface of a rotatable handle such that rotation of said handle is operable to effect rotation of said jack handle rod; and said jack handle coupling comprising a sleeve mounted over and fixedly secured to said knuckle joint of one of said jack handle rod and jack handle rod extension, said sleeve having an extension portion extending beyond said knuckle joint of said one of said jack handle rod and jack handle rod extension, said extension portion of said sleeve having an internal receptacle cavity configured to receive in a slip-fit, non-rotatable driving relationship the knuckle joint of said other of said jack handle rod and jack handle rod extension, and said jack handle coupling including a wire spring engageable with a flat surface of said knuckle joint of said other of said jack handle rod and jack handle rod extension to secure said jack handle rod and said jack handle rod extension in coupled engagement.

14. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a J-shaped knuckle joint;

said jack handle rod extension having a J-shaped knuckle joint; and said jack handle coupling comprising a sleeve mounted over and secured to said J-shaped knuckle joint of said jack handle rod, said sleeve having an extension portion extending beyond said J-shaped knuckle joint of said jack handle rod, said extension portion of said sleeve having an internal receptacle cavity configured to receive in a slip-fit, non-rotatable driving relationship the J-shaped knuckle joint of said jack handle rod extension.

15. The two-piece handle of claim 14 wherein said J-shaped knuckle joint of said jack handle rod extension is formed by bending one end of the jack handle rod extension 180°.

16. The two-piece handle of claim 14 wherein said J-shaped knuckle joint of said jack handle rod is formed by bending one end of the jack handle rod 180°.

17. The two-piece handle of claim 14 wherein said jack handle coupling includes a wire spring engageable with a flat surface of said J-shaped knuckle joint of said jack handle rod extension to secure said jack handle rod and said jack handle rod extension in coupled engagement.

18. A two-piece handle for use in positioning a vehicle lifting jack beneath a vehicle and for rotating a spindle of that jack, said handle comprising:

a jack handle rod, a jack handle rod extension, and a jack handle coupling for releasably interconnecting said jack handle rod and said jack handle rod extension in coaxial alignment;

said jack handle rod having a J-shaped knuckle joint formed by bending one end of the jack handle rod 180° into a J-shaped configuration;

said jack handle rod extension having a J-shaped knuckle joint formed by bending one end of the jack handle rod extension 180° into a J-shaped configuration; and said jack handle coupling comprising a sleeve mounted over and secured to said J-shaped knuckle joints of said jack handle rod and said jack handle rod extension.

19. The two-piece handle of claim 18 wherein said jack handle coupling includes a wire spring engageable with a flat surface of said J-shaped knuckle joint of said jack handle rod extension to secure said jack handle rod and said jack handle rod extension in coupled engagement.

* * * * *